United States Patent [19]

Fujisaki

[11] Patent Number: 4,853,953
[45] Date of Patent: Aug. 1, 1989

[54] VOICE CONTROLLED DIALER WITH SEPARATE MEMORIES FOR ANY USERS AND AUTHORIZED USERS

[75] Inventor: Hisashi Fujisaki, Tokyo, Japan
[73] Assignee: NEC Corporation, Japan
[21] Appl. No.: 255,651
[22] Filed: Oct. 7, 1988
[30] Foreign Application Priority Data Oct. 8, 1987 [JP] Japan ................................ 62-255881
Oct. 21, 1987 [JP] Japan ................................ 62-263937

[51] Int. Cl.$^4$ .......................................... H04M 1/515
[52] U.S. Cl. ...................... 379/88; 379/216; 379/355
[58] Field of Search ............... 379/67, 88, 89, 216, 379/355, 354, 360, 361

[56] References Cited

U.S. PATENT DOCUMENTS

| | | | |
|---|---|---|---|
| 4,644,107 | 2/1987 | Clowes et al. | 379/354 |
| 4,731,811 | 3/1988 | Dubus | 379/58 |
| 4,757,525 | 7/1988 | Matthews et al. | 379/89 |
| 4,763,350 | 8/1988 | Immendorfer et al. | 379/67 |

Primary Examiner—Thomas W. Brown
Attorney, Agent, or Firm—Laff, Whitesel, Conte & Saret

[57] ABSTRACT

A voice controlled automatic dialer comprises a speech analyzer for generating a signal representative of characteristic patterns of an input utterance entered through a microphone, and a first memory for storing a plurality of reference signals representative of predetermined characteristic patterns of utterances of dialing numbers and command words, the predetermined characteristic patterns being representative of utterances common to any users. A second memory stores a plurality of reference signals representative of specific characteristic patterns of utterances of dialing names which are defined by authorized users. The output signal of the speech analyzer is compared with the reference signals stored in the first and second memories and an output is generated as representative of least distances between the characteristic patterns of the input and the stored patterns. The result of the comparison is indicated by a synthesized speech or a multifrequency tone to permit users to confirm the validity of the input utterances. A manually operated switch couples the output of the speech analyzer to the second memory when it is desired to store a user-specific dialing name into the second memory after a training process.

9 Claims, 1 Drawing Sheet

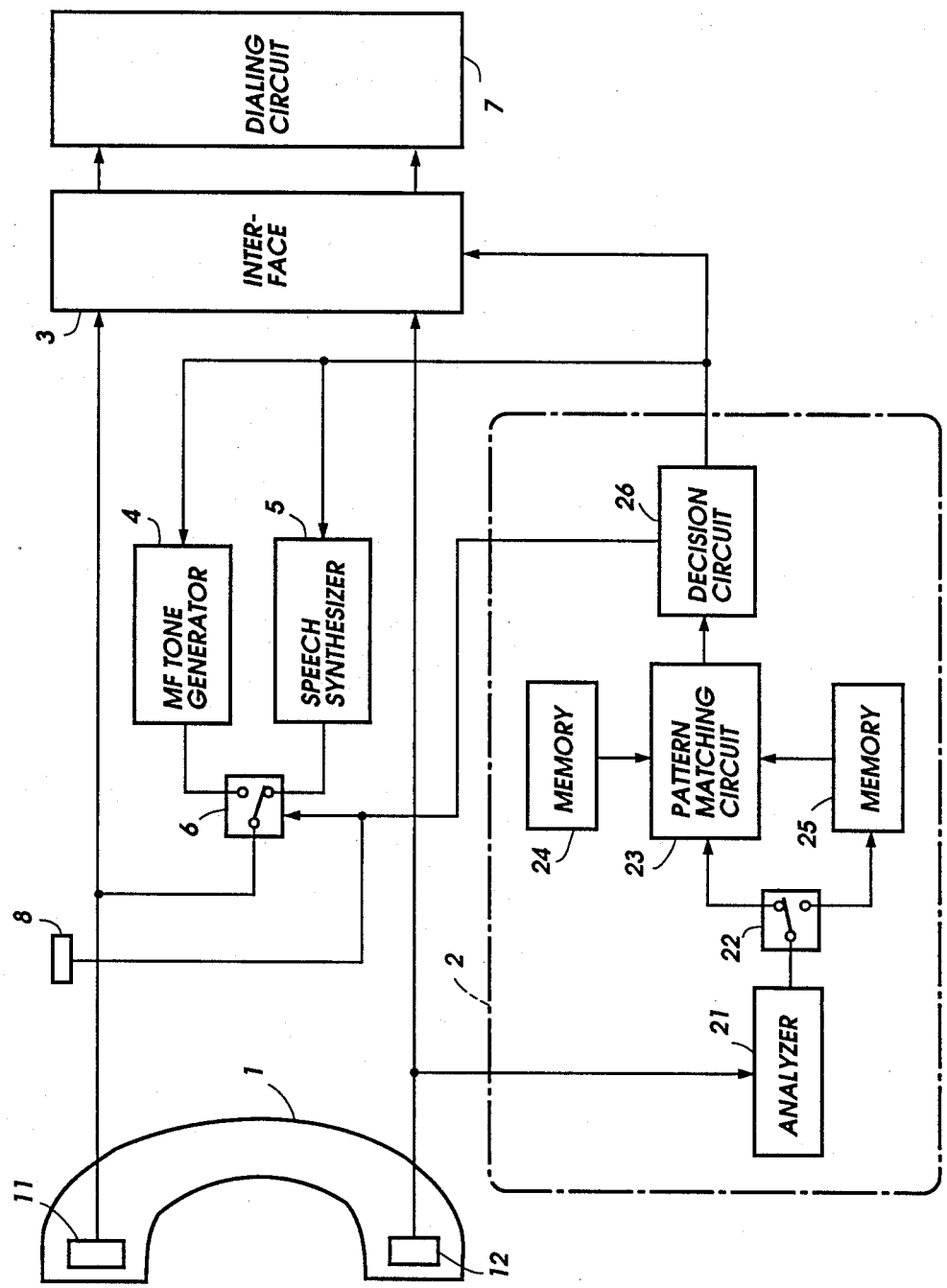

VOICE CONTROLLED DIALER WITH SEPARATE MEMORIES FOR ANY USERS AND AUTHORIZED USERS

BACKGROUND OF THE INVENTION

The present invention relates generally to an automatic dialer for telephone sets, and more particularly to a voice controlled automatic dialer.

A voice controlled automatic dialer is known wherein a speech pattern memory is employed to store a plurality of characteristic patterns of dialing names specific to an authorized user or a group of authorized users through a training process. The stored characteristic patterns are used as references for comparison with input utterances to detect a match. Because of the training process, however, the storage of additional information such as dialing numbers and command words is tedious and cumbersome.

On the other hand, another known speech recognition technique is of the type in which predetermined speech patterns are prestored as representative of speech patterns of general users. However, due to response time and memory capacity limitations, the number of words that can be stored is limited and hence it is desirable for users to customize the contents of the memory of their specific needs.

SUMMARY OF THE INVENTION

It is therefore an object of the present invention to provide a voice controlled automatic dialer which combines the advantage of a speech recognition technique of the type requiring a training process for entry of user-specific reference patterns such as user's dialing names and the advantage of a speech recognition technique of the type in which predetermined general reference patterns such as dialing numbers and command words are prestored, eliminating the disadvantage of both speech recognition techniques.

It is a further object of the invention to provide a voice controlled automatic dialer which allows users to verify their input utterances in the form of synthesized speech or a multifrequency tone.

Specifically, the voice controlled automatic dialer of the present invention comprises a speech analyzer connected to a microphone for generating a signal representative of characteristic patterns of an input utterance entered through the microphone, a first memory for storing a plurality of reference signals representative of predetermined characteristic patterns of utterances of dialing numbers and command words. Such predetermined characteristic patterns are representative of utterances common to any users. A second memory is provided for storing a plurality of reference signals representative of specific characteristic patterns of utterances of dialing names which are defined by authorized users and entered through the microphone to the speech analyzer after a training process. A pattern matching and decision circuit compares the output signal of the speech analyzer with the reference signals stored in the first and second memories and generates a decision output representative of least distances between the characteristic patterns of the input utterance and the characteristic patterns represented by the reference signals. A manually operated switch couples the output of the speech analyzer to the second memory when the reference signal representing a user-specific dialing name is to be stored into the second memory and couples the output of the speech analyzer to the pattern matching and decision circuit during a full-digit dialing mode or abbreviated dialing mode. The decision output is supplied to a dialing circuit to generate a dialing signal for transmission to a switched network. Preferably, the decision output is further applied to a speech synthesizer and/or a multifrequency tone generator for coupling their outputs to a receiver or a loudspeaker to allow users to confirm their utterances.

BRIEF DESCRIPTION OF THE DRAWING

The present invention will be described in further detail with reference to the accompanying drawing which illustrates a voice controlled automatic dialer according to an embodiment of the present invention.

DETAILED DESCRIPTION

In the sole drawing, the voice controlled automatic dialer of the present invention comprises a handset 1 having a receiver 11 and a microphone 12, a speech recognizer 2 and an interface circuit 3 which is connected to a dialing circuit 7 of either impulse or multifrequency type for transmitting dial impulses or multifrequency tone bursts to a switched telephone network, not shown. The speech recognizer 2 has an input connected to the microphone 12 and an output connected to the interface circuit 3 for causing the dialing circuit 7 to generate control signals for offhook and other control functions and dialing signals. Speech recognizer 2 comprises a speech analyzer 21 which analyzes characteristic parameters of input utterances supplied from the microphone 12. A typical example of the speech analyzer 21 is a processor of the type $\mu$PD7763D manufactured by NEC Corporation which analyzes the outputs of sixteen band-pass filters covering a range from 250 Hz to 5400 Hz during a frame interval which can be adjusted in a range between 10 milliseconds and 30 milliseconds. It is preferred that a frequency range of from zero to 8000 Hz be used for speech analysis. The number of such band-pass filters which can be used in the present invention may be varied in a range between 8 and 32. Instead of the band-pass filters, Fast Fourier Transform (FFT) technique can be employed. In such instances, the number of spectrums to be analyzed is also in the range between 8 and 32. The characteristic patterns of the analyzed input utterance can be derived from the total sum of the outputs of the band-pass filters or the spectrums of the FFT analysis.

The output of the speech analyzer 21 is applied to a manually controlled switch 22 which is in an upper position when a call is placed to couple the output of analyzer 21 to a pattern matching circuit 23 and switched to a lower position when a user-specific "dialing name" is to be registered for abbreviated dialing in a manner described hereinbelow. The pattern matching circuit 23 compares the characteristic patterns of the input utterance with standard characteristic patterns which have been prestored in a first memory 24 as representative of general characteristic patterns of dialing numbers and commands necessary for the entry of telephone numbers and the commands for operating the switchhook, not shown.

These prestored patterns are derived from many unspecified persons and used for pattern matching when a call is placed in a normal, full-digit dialing mode and for control of the switchhook. The circuit 23 further compares the input patterns with other standard characteristic patterns stored in a second memory 25 are representative of characteristic patterns of dialing names specific to authorized users. These specific characteristic patterns are derived from the output of speech analyzer 21 by entering authorized user utterances to microphone 12 after a training process and by moving the switch 22 to the lower position to couple the output of the speech analyzer 21 to the second memory 25. A match will be detected in these specific characteristic when a call is placed in an abbreviated dialing mode by the authorized users.

Preferably, the pattern matching is performed in accordance with a dynamic programming algorithm in a manner as described in the article "Dynamic programming algorithm optimization for spoken word recognition" by Hiroaki Sakoe and Seibi Chiba, IEEE Transactions on Acoustics, Speech, and Signal Processing, Vol. ASSP-26, No. 1, February 1978, pages 43-49. Specifically, the pattern matching circuit 23 nonlinearly expands and compresses the time scale of the input and derives an output as a measure of the distance between two features. The output of the pattern matching circuit 23 is applied to a decision circuit 26. Decision circuit 26 recognizes those outputs of the matching circuit 23 having least distances at the most likely candidates and supplies an output signal through interface 3 to a dialing circuit 7.

The output of decision circuit 26 is further applied to a multifrequency tone generator 4 of the type similar to that used in the dialing circuit 7 to generate a multifrequency tone signal by mixing two audio frequencies in response to the entry of utterance to the microphone 12 during a dialing process. For example, if a dialing number "one" is spoken into the microphone 12, tone signals at 697 Hz and 1209 Hz are mixed together and if "five" is entered, tone signals at 770 Hz and 1336 Hz are mixed together. For command signals such as "send-to-line", "clear" and "verify" are in the form of a single frequency tone signal. The output of the tone generator 4, whether multiple frequencies or single frequency, is in the form of a burst of duration sufficient to permit the user to identify each input utterance. The duration of 100 millisecond is found to be appropriate for this purpose.

The output of decision circuit 26 is further applied to a speech synthesizer 5 to synthesize spoken words corresponding to the utterances entered through the microphone 12 during a dialing process. The outputs of the tone generator 4 and speech synthesizer 5 are selectively coupled through a switch 6 to the receiver 11 to allow the user to confirm that his or her utterances are correctly interpreted by the speech recognizer 2. Switch 6 is operated in response to a manual command from a key 8 or in response to a control signal from decision circuit 26.

Decision circuit 26 further distinguishes between spoken words of dialing numbers and those of command words. When an utterance of a dialing number is entered, a tone signal is sounded by receiver 11 for confirmation of the entered dialing numbers. If a command word is entered subsequently, decision circuit 26 applies a control signal to switch 6 to supply the output of speech synthesizer 5 in place of the output of tone generator 4 to the receiver 11 to give a synthesized sound of the input command word for confirmation of the command words by the user.

When a call is placed, switch 22 is in the upper position to connect the output of speech analyzer 21 to pattern matching circuit 23. If the dialing is in a normal, full-digit mode, the analyzed spoken words of dialing numbers and command words from speech analyzer 21 are compared with the contents of memories 24 and 25 and a match will be detected in the full-digit spoken words of memory 24. If a call is made by a user authorized for access to abbreviated dialing, the dialing can be processed by entering his or her specific dialing name stored in memory 25. In this case, a match will be detected in the contents of memory 25. Switch 6 can be controlled by a manual input from the key 8 to couple the tone signal or speech signal. This allows a multifrequency tone burst to be heard exclusively in response to the utterance of a dialing number or allows a synthesized word to be exclusively heard in response to the utterance of a command word.

Alternatively, a single frequency tone burst can be generated by the tone generator 4 in response to the utterance of a command word instead of the output of synthesizer 5. Switch 6 also permits users to couple the output of synthesizer 5 to the receiver 11 during initial period of use to take advantage of the ease with which synthesized words are understood and switch the output of tone generator 4 to the receiver 11 after the initial period to take advantage of the fast response time of tone generator 4.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A voice controlled automatic dialer comprising:
  sound input means;
  a speech analyzer connected to said sound input means for generating a signal representative of characteristic patterns of an input utterance entered through said sound input means;
  a first memory for storing a plurality of reference signals representative of predetermined characteristic patterns of utterances of dialing numbers and command words, said predetermined characteristic patterns being representative of utterances common to any users;
  a second memory for storing a plurality of reference signals representative of specific characteristic patterns of utterances of dialing names defined by authorized users and entered through said sound input means to said speech analyzer after a training process;
  decision means for comparing the output signal of said speech analyzer with the reference signals stored in said first and second memories and generating a decision output representative of least distances between the characteristic patterns of the input utterance and the characteristic patterns represented by said reference signals;
  manually operated switch means for coupling the output of said speech analyzer to said second memory when the reference signal representing said dialing names is stored thereinto and coupling the output of said speech analyzer to said decision means during a full-digit dialing mode or abbreviated dialing mode; and means responsive to said decision output for generating a dialing signal for transmission to a switched network.

2. A voice controlled automatic dialer claimed in claim 1, further comprising sound output means and sound generating means repsonsive to said decision output for supplying an audio frequency signal to said sound output means.

3. A voice controlled automatic dialer as claimed in claim 2, wherein said sound generating means comprises a tone generator for generating a multifrequency tone burst in response to the entry of an input utterance to said sound input means when said input utterance is a dialing number.

4. A voice controlled automatic dialer as claimed in claim 3, wherein said tone generator generates a single frequency tone burst in response to the entry of said input utterance when same is a command word.

5. A voice controlled automatic dialer as claimed in claim 4, wherein said sound generating means further comprises a speech synthesizer for supplying a synthesized replica of sound command word to said sound output means.

6. A voice controlled automatic dialer as claimed in claim 5, further comprising a second manually controlled switch for selectively coupling the outputs of said tone generator and said speech synthesizer to said sound output means.

7. A voice controlled automatic dialer as claimed in claim 2, wherein said sound generating means comprises a speech synthesizer for generating a synthesized word in response to the entry of an input utterance to said sound input means.

8. A voice controlled automatic dialer as claimed in claim 1, wherein said speech analyzer analyze frequency components of the input utterances to said sound input means over a frequency range between 0 and 8000 Hz for 10 milliseconds to 30 milliseconds.

9. A voice controlled automatic dialer as claimed in claim 1, wherein said decision means nonlinearly expands and compresses time scale of the output of said speech analyzer in accordance with dynamic programming algorithm prior to the comparison between said characteristic patterns.

* * * * *